Patented Feb. 7, 1939

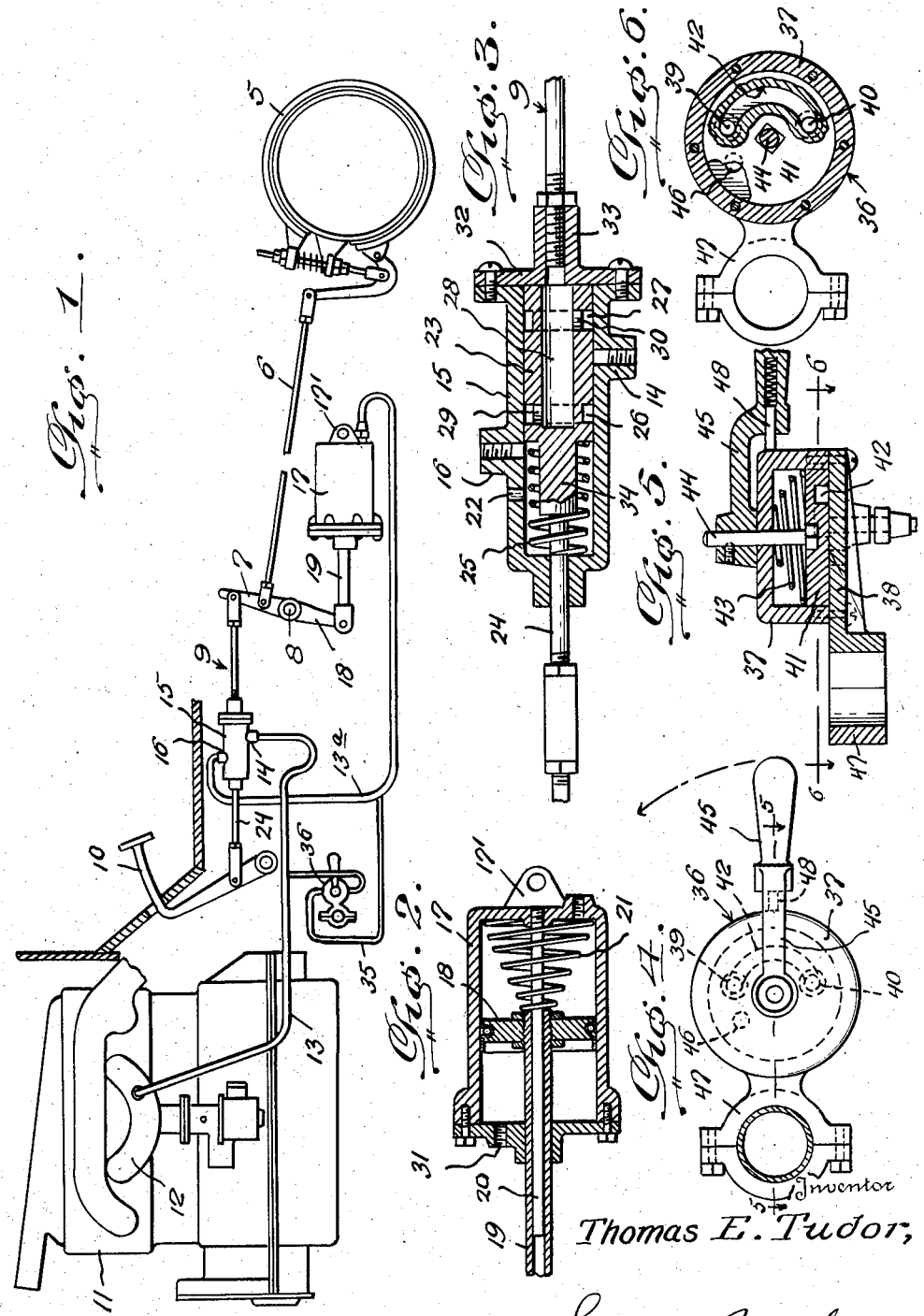

2,146,491

UNITED STATES PATENT OFFICE 2,146,491

VACUUM BRAKING DEVICE

Thomas E. Tudor, Frankfort, Ind.

Application August 11, 1936, Serial No. 95,417

2 Claims. (Cl. 188—152)

This invention relates to braking apparatus, and has more particular reference to vacuum braking devices for use in connection with motor vehicles which are driven by internal combustion engines.

More particularly, the present invention contemplates improvements upon braking apparatus wherein the intake manifold of the internal combustion engine has communication through a valve-controlled conduit with a braking cylinder whose piston is connected with manually operated brake mechanism, the piston of the brake cylinder being operated to apply the brakes when the engine is throttled and a relatively high degree of suction is created within the intake manifold of said engine.

An important object of the present invention is to provide a braking apparatus of the above kind wherein improved means is provided to establish communication between the intake manifold and the braking cylinder when the brake pedal is depressed to apply the brakes, and whereby a predetermined amount of vacuum braking force is applied to the braking mechanism in accordance with the pressure applied to the brake pedal.

Another object of the present invention is to provide a brake apparatus of the above kind which may be operated by manual effort applied to the brake pedal, in the event that the power energy fails.

A still further object of the present invention is to provide a braking apparatus of the above kind which is simple and durable in construction, efficient and positive in action, and economical to produce and install.

With the above general objects in view and others that will become apparent as the nature of the invention is better understood, such invention consists in the novel form, combination and arrangement of parts hereinafter more fully described shown in the accompanying drawing and claimed.

In the drawing:

Figure 1 is a view partly in longitudinal section and partly in side elevation, showing the general arrangement of a braking mechanism embodying the present invention;

Figure 2 is an enlarged fragmentary longitudinal section showing the internal construction of the brake cylinder and associated parts;

Figure 3 is a view similar to Figure 2, showing the internal construction of the valve for controlling communication between the intake manifold and the brake cylinder and forming part of the apparatus shown in Figure 1;

Figure 4 is a view showing in top plan a hand operated valve which may be employed for controlling communication between the intake manifold and the braking cylinder;

Figure 5 is a vertical section on line 5—5 of Figure 4; and

Figure 6 is a horizontal section on line 6—6 of Figure 5.

The present invention can be employed in connection with various types of vehicles and various forms of braking mechanism. As shown in the drawing, one of the brakes, which may be of any well known form, is indicated at 5. Through a link 6, lever 7, a rock shaft 8, and a link 9, braking force is manually applied from the usual brake pedal 10.

The internal combustion engine 11 of the motor vehicle is provided with the usual intake manifold 12, and tapped into this manifold is a pipe 13 leading to a port 14 of a control valve including a casing 15 provided with said port 14 and with a second port 16. A second pipe 13a provides communication between the port 16 and one end of a brake cylinder 17. The brake cylinder 17 is provided at this end with a pair of spaced ears 17' to facilitate pivotal mounting of said brake cylinder on the frame of the vehicle for vertical swinging movement, on which frame the shaft 8 is also journalled.

The cylinder 17 is provided with a piston 18 which is connected with a crank 18 secured to the shaft 8. The link 6 is of course connected to the lever or arm 7, and said lever or arm 7 is secured to the shaft 8. As shown clearly in Figure 2, the piston 18 has a hollow rod 19 which slidably projects through the front end or head of cylinder 17 and is pivotally connected to the arm 18, one end of rod 19 extending through and being rigidly secured to the center of the piston 18. Rigidly secured at one end to the rear or pivoted end of cylinder 17 is a guide rod 20 that extends axially through the cylinder 17 and piston 18 and has a sliding fit in the piston rod 19. A tapered helical compression spring 21 is disposed in the cylinder 17 and encircles the guide rod 20 between the piston 18 and the rear end of cylinder 17. This spring 21 serves to assist in returning the piston 18 to its forward or retracted position. As the spring 21 is conical and closely encircles the guide rod 20 adjacent the piston 18, as well as fitting the bore of cylinder 17 at its rear end, said spring 21 is centered so as to operate efficiently and to have no tilting influence on the piston 18 or its rod 19 such as might set up a binding action between said piston and cylinder 17 or between the rod 19 and the head of cylinder 17 through which said rod 19 passes. Such tilting tendencies and consequent binding of the piston and piston rod are also insured against by reason of the guide rod 20 and its sliding fit in the piston rod 19, particularly as the guide rod 19 projects forwardly well beyond the forward end or head of cylinder 17. By reason of this construction, a brake cylinder is had in which the piston of said cylinder may work smoothly and easily and in which the packing of said piston will wear uniformly so as to last for a relatively long period of time.

As above stated, communication between the intake manifold 12 and the cylinder 17 through the line composed of pipes 13 and 13a, is controlled by the valve including valve casing 15 that is interposed in said line and also has a third port 22 which communicates with the atmosphere.

The control valve embodying casing 15 is of the two-way type including a movable valve member in the form of a piston 23 slidably fitted in the casing 15 and provided with an axial operating stem 24 that slidably projects through one end of the casing 15. The piston 23 is yieldingly urged toward and normally maintained at the other end of casing 15 by means of a helical compression spring 25 arranged in the casing 15 and encircling the stem 24 between piston 23 and the adjacent end of the casing 15. The piston 23 is provided with spaced annular peripheral grooves 26 and 27 and an axial bore 28 communicating with said grooves 26 and 27 through ports 29 and 30. As shown in Figure 3, the pipe 13a is normally placed in communication with the atmosphere by way of ports 16 and 22 and the space in casing 15 surrounding the stem 24 between the forward end of casing 15 and the forward end of piston 23 which is located entirely rearwardly of port 16. Thus, when pressure is relieved from pedal 10, spring 25 retracts piston 23 to the position of Figure 3 so as to permit air to be drawn into the rear end of cylinder 17 behind piston 18 as the piston 18 is urged forwardly by spring 21 to release the brakes. On the other hand, when pedal 10 is depressed to apply the brakes, the piston 23 is drawn forwardly against the action of spring 25 so as to aline groove 26 with port 16 and groove 27 with port 14, thus establishing communication between pipes 13 and 13a and consequently between the manifold 12 and the rear end of cylinder 17. When this is done, the piston 18 moves to the right of Figure 2 or rearwardly against the action of spring 21 so as to cause application of the brakes, atmospheric air being admitted to the forward end of cylinder 17 at the forward or left hand side of piston 18 through a constantly open port 31 provided in the forward or left hand end or head of cylinder 17. In other words, the engine suction creates a vacuum in the rear end of cylinder 17 behind the piston 18, while atmospheric pressure in front of piston 18 causes the latter to move rearwardly against the action of spring 21 and apply the brakes. At this time, the forward portion of piston 23 is positioned between the ports 16 and 22 so as to close communication between the latter, thereby preventing admission of atmospheric air into the pipe 13a.

It is noted that the control valve forms a lost motion connection between the pedal 10 and the arm or lever 7 so as to render the power means operative before or in advance of any possibility of using manual effort in applying the brakes. For this purpose, the link 9 is composed of two sections, the stem 24 constituting one section and being pivotally connected to the pedal 10, and the other section being pivotally attached to the arm 7 at one end and being secured to the rear end of casing 15 at its other or forward end. Preferably, the rear end of the cylinder 15 is closed by a head 32 having an external axial boss 33 into which the forward end of the rear section of link 9 is threaded and secured. Obviously, should the power energy fail for any reason so that the brakes are not applied when the pedal has been depressed sufficiently to shift the piston 23 to its forward position against the action of spring 25, the brakes may be applied by manual effort by simply further depressing the pedal 10, at which time no further relative movements of the piston 23 and casing 15 away from each other is permitted by reason of the engagement of a rear enlarged portion of stem 24 with the forward end of cylinder 15, which enlarged portion of stem 24 is indicated at 34.

If desired, the braking power may also be controlled by hand by providing a communication between pipes 13 and 13a as indicated at 35 in Figure 1, and by providing a hand operated control valve 36 in this communication. A suitable hand operated valve may be of the construction shown in Figures 4 to 6 inclusive wherein there is provided a circular casing composed of a body 37 of inverted cup-shape and a plate 38 closing the bottom of this body and provided with spaced ports 39 and 40. Arranged in the casing thus provided, there is rotatably fitted a movable valve member in the form of a disk 41 having an arcuate groove 42 in the bottom side thereof and being resiliently and firmly seated against the bottom closure plate 38 by means of a helical compression spring 43 arranged in the body 37 above the disk 41. The body 37 has a central opening in the top thereof in which is journalled a shaft 44 to the lower end of which the disk 41 is keyed and to the upper end of which is attached an operating handle 45. The bottom closure plate is also provided with a third port 46 adjacent the port 39, and the arrangement is such that when the disk 41 is rotated to one position as shown in Figures 4 and 6, the groove 42 affords communication between the ports 39 and 40, while partial rotation of disk 41 in the direction indicated by the arrow in Figure 4 will cause closing of port 40 and the placing of ports 39 and 46 in communication with each other by way of groove 42. Obviously, by connecting port 39 with pipe 13a and port 40 with pipe 13, the valve 36 may be utilized to either place the manifold 12 in communication with cylinder 17 or to cut off communication between the manifold 12 and cylinder 17 and simultaneously place said cylinder 17 in communication with the atmosphere. In other words, when the disk 41 is in the position of Figures 4 and 6 suction will be utilized to apply the brakes, the suction being applied behind piston 18 and atmospheric air being admitted through port 31. On the other hand, if the disk 41 is rotated so as to close port 40 and place the ports 39 and 46 into communication with each other, the spring 21 may return the piston 18 to brake releasing position, atmospheric air being admitted behind piston 18 by way of port 46, port 39, groove 42 and pipe 13a, and air being fed from cylinder 17 in front of piston 18 by way of port 31. The manual control valve is preferably constructed as to be readily mounted on the steering column of the motor vehicle, and for this purpose the valve may be provided with an attaching clamp 41, one half of which may be cast integral with the bottom closure plate 38. Also, means is preferably provided to prevent accidental or relatively easy turning of handle 45 and disk 41, such as a spring pressed pin 48 carried by handle 45 and engaging the periphery of body 37.

While the structural features of this invention have been shown and described more or less specifically, it is to be understood that the invention is susceptible of such modifications as fairly fall within the scope of the invention as claimed.

What I claim as new is:

1. In a vehicle brake, a vacuum line, a valve for controlling the flow through said line, a vacuum cylinder vented constantly to the atmosphere at its forward end and pivoted to the vehicle frame on a horizontal axis at its rear end, said vacuum line being connected to the rear end of said cylinder, a piston in said cylinder having a piston rod slidably extending through the forward end of said cylinder, braking mechanism, an operative connection between said piston rod and said braking mechanism including a lever having a depending arm pivoted to the forward end of said piston rod, a manually operable brake lever, said lever having a second upwardly extending arm, means operatively connecting said brake lever with said upwardly extending arm, a spring normally maintaining said piston forwardly in said cylinder with said brake mechanism in brake-released position, said means operatively connecting the brake lever with the upwardly extending lever arm including a sectional link having said control valve interposed in and forming a lost motion connection between the sections of said sectional link, one section of said link being pivoted at its forward end to said brake lever, the other section of said link being pivoted at its rear end to said upwardly extending lever, and said control valve including a casing rigid with one of said link sections, and a piston valve member slidable in said casing and rigid with the other link section, said valve casing having a port near one end connected to the vacuum cylinder and a second port near the other end connected to said vacuum line, said valve casing further having a third port adjacent the first-named port and opening to the atmosphere, said piston valve member having an axial bore and radial ports communicating with said bore and arranged to connect the two first-named ports of the casing when the piston valve member is moved relative to the casing in one direction by operation of the brake lever to apply the brakes, said piston valve member being further arranged to uncover and afford communication between the first and the third named ports and to simultaneously close the second-named port when the piston valve member is moved relative to the casing in the opposite direction upon return of the brake lever to brake-releasing position, and yieldable means to normally move the piston valve member in the latter direction.

2. In a vehicle brake, a vacuum line, a valve for controlling the flow through said line, a vacuum cylinder vented to the atmosphere at its forward end and pivoted to the vehicle frame on a horizontal axis at its rear end, said vacuum line being connected to the rear end of said cylinder, a piston in said cylinder having a piston rod slidably extending through the forward end of said cylinder, braking mechanism, an operative connection between said piston rod and said braking mechanism including a lever having a depending arm pivoted to the forward end of said piston rod, a manually operable brake lever, said lever having a second upwardly extending arm, means operatively connecting said brake lever with said upwardly extending arm, a spring normally maintaining said piston forwardly in said cylinder with said brake mechanism in brake-released position, said piston rod being hollow and rigidly secured to and extending through the center of said piston, a guide rod rigid with the rear end of the vacuum cylinder and slidably fitted in said piston rod, said guide rod extending axially through said piston and forwardly beyond the forward end of said cylinder, said spring encircling the guide rod between said piston and the rear end of said cylinder and being of conical form to snugly engage the guide rod at one end adjacent the piston and to have a large bearing against the cylinder at the other end.

THOMAS E TUDOR.